Nov. 7, 1967   M. A. PETROZZIELLO   3,351,338
APPARATUS FOR TRANSPORTING AND FOLDING A COLLAGEN CASING
Filed Aug. 18, 1965
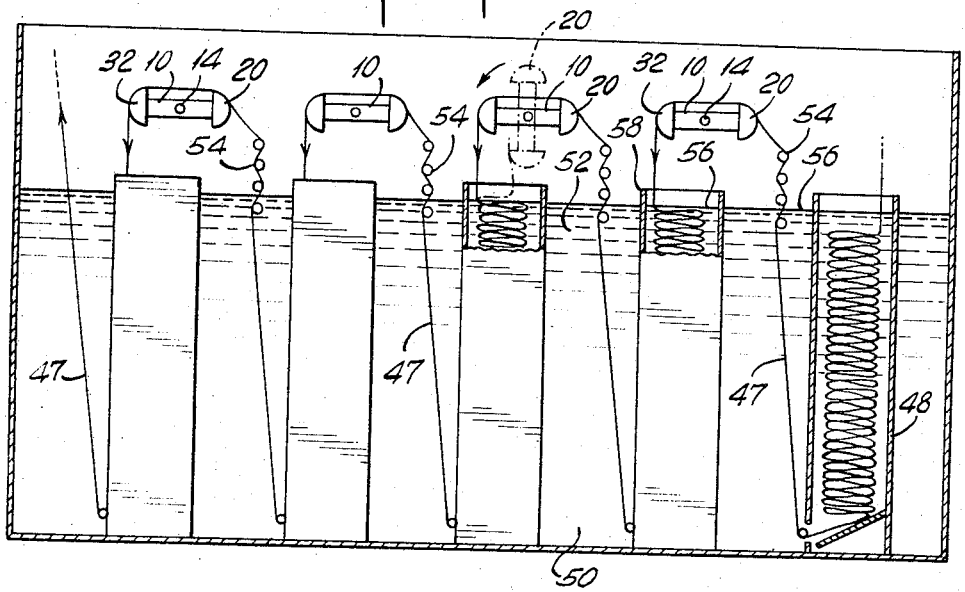
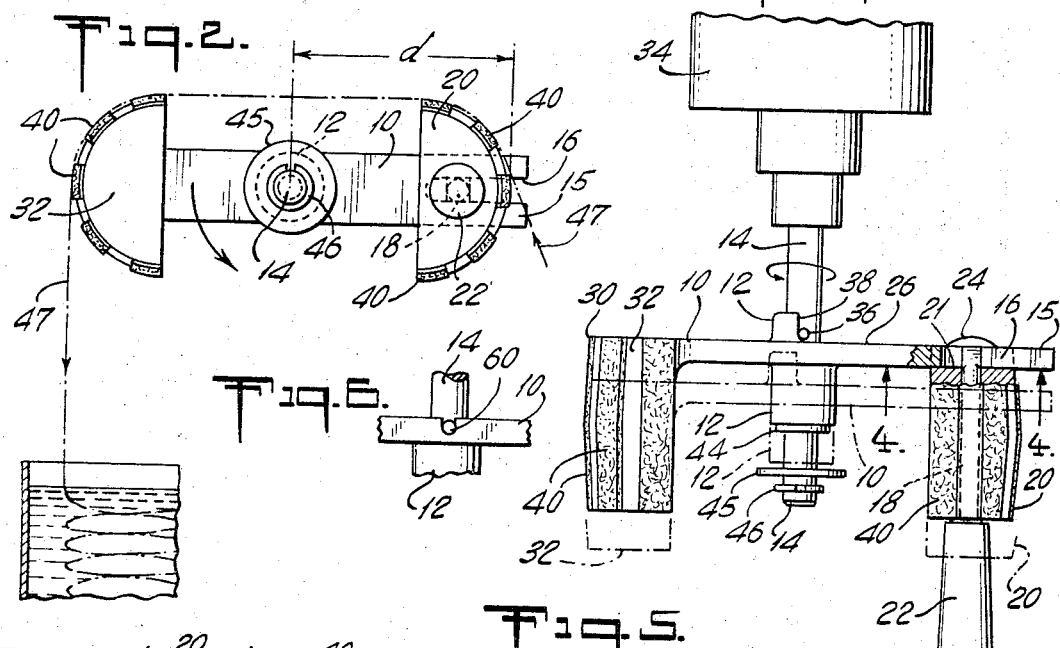
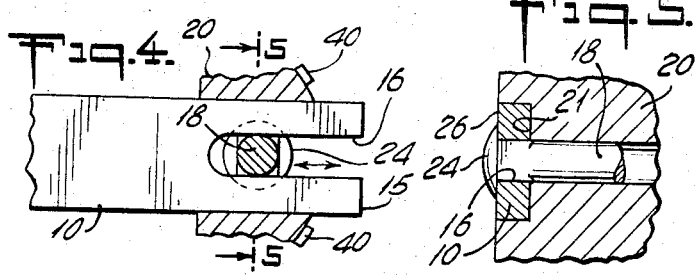
INVENTOR.
MICHAEL A. PETROZZIELLO
BY
Robert W. Kell
ATTORNEY United States Patent Office 3,351,338
Patented Nov. 7, 1967

3,351,338
APPARATUS FOR TRANSPORTING AND
FOLDING A COLLAGEN CASING
Michael A. Petrozziello, Middlesex, N.J., assignor to
Johnson & Johnson, a corporation of New Jersey
Filed Aug. 18, 1965, Ser. No. 480,728
5 Claims. (Cl. 270—79)

ABSTRACT OF THE DISCLOSURE

A bar, mounted for rotation on a shaft, is constructed with a longitudinal slot in one end thereof. A cylindrical member is mounted in the slot with its axis parallel to the shaft, and a second cylindrical member is mounted on the other end of the bar with its axis parallel to the shaft. The apparatus is used to transport and fold a continuous length of collagen tubing.

This invention relates to the manufacture of extruded collagen casings and more particularly to new and useful apparatus for contacting a continuous length of extruded collagen casing with a plurality of liquids.

The manufacture of collagen casings from a mass of swollen collagen solids is described in United States Patent No. 3,123,653 which discloses the apparatus and physical steps involved in handling the extruded collagen casing as it passes from the extruder through the various conditioning baths and the drying operation. Because the collagen casing immediately after extrusion is quite fragile and easily broken, it is important that the casing be handled with minimum stress and tension as it contacts the various conditioning liquids employed in the manufacturing process.

It is an object of the present invention to provide an alternate means for transporting the extruded casing without deformation or breakage through a plurality of liquid baths.

Yet another object of the present invention is to provide an adjustable oblate godet that will transport and fold a continuous length of extruded collagen casing.

These and other objects of the invention will be more apparent after referring to the following description and attached drawings in which:

FIGURE 1 is a side elevation of a series of tanks for treating a continuous length of extruded collagen casing with a plurality of conditioning liquids;

FIG. 2 is a side elevation of an oblate godet;

FIG. 3 is a top plan view of the godet illustrated in FIG. 2;

FIG. 4 is a view on the line 4—4 of FIG. 3;

FIG. 5 is a view on the line 5—5 of FIG. 4; and,

FIG. 6 is an enlarged fragmentary plan view showing a modified drive means.

The godet of the present invention is generally oblate in shape and consists of a bar 10 fashioned with a bearing 12 adapted to receive the shaft 14. At one end 15 of the bar 10 there is a slot 16 dimensioned to receive the shank of lag bolt 18 which passes through a first cylindrical element 20. This cylindrical element has at one end a channel 21 the width of which is slightly greater than the width of the bar 10. The cylindrical element 20 is movable on the bar 10 in the directions indicated by the arrow in FIG. 4. A threaded end on the lag bolt 18 engages a handle 22 which, when turned, tightens the head 24 of the bolt 18 against the back surface 26 of the bar and forces the channel 21 of the cylindrical element against the front surface of the bar.

At another end 30 of the bar is a second cylindrical element 32 which may be cast integral with the bar. The cylindrical elements 20 and 32 are so positioned on the bar that the axis of both cylinders is parallel to the axis of the shaft.

The shaft 14 is rotated by a motor 34 which motion is transmitted to the godet by a pin 36 which presses against a shoulder 38 that projects beyond the bearing 12. While the parts of the godet are preferably constructed of metal the handle 22 may be made of wood or plastic. Longitudinal strips of felt 40 or some fabric material having a similar resiliency and coefficient of friction may be glued or secured in some other manner to the surface of the cylinders 20 and 32. Preferably the diameters of the cylindrical elements 20 and 32 are equal and greater at the middle of the cylinder than at either end thereof.

The shoulder 38 of the godet is held against the pin 36 by a neoprene or rubber O-ring 44 frictionally mounted on the shaft 14. A washer or shim 45, the internal diameter of which is slightly greater than the diameter of the shaft 14, is placed between the O-ring 44, and a retaining ring 46 that is placed on the end of the shaft.

In operation the godet is driven by the motor 34 through drive shaft 14, pin 36, and the shoulder 38 in the direction of the arrow in FIG. 1. As the godet rotates it removes the collagen casing 47 from the bottom of the compartment 48 in tank 50 and gently pulls it through a liquid 52 and over guideposts 54. The casing then falls by gravity to the surface 56 of the liquid in the next adjacent compartment 58.

In asmuch as the cylindrical surface of the godet that supports the weight of the casing above the compartment 58 moves from left to right as shown in dotted lines in FIG. 1, the casing is evenly folded as it falls on the surface of the liquid, the folds slowly sinking toward the bottom of the compartment from which they are removed by the next godet in the series. If the transfer of the casing from one tank to the next succeeding tank is not uniform, an excessive quantity of the casing can build up in one compartment. To solve this problem it is only necessary to stop temporarily the godet that supplies that tank. This may be done by moving the godet axially in the direction of a retaining ring 46 to the position shown in dotted lines in FIG. 3, at which point the pin 36 clears the shoulder 38. To reduce the amount of casing transported by the godet that resulted in non-uniform distribution of the casing, the effective diameter $d$ of that godet can be adjusted by unscrewing the handle 22 to loosen the same, thereby permitting movement of the lag bolt 18 along the slot 16 to change the distance $d$ between the center of the shaft and the surface of the cylindrical element 20.

When the excess amount of casing that is present in one of the compartments has been removed, the godet that transfers the casing to that compartment may be again engaged with the shaft by pressing against the shim 45 in the direction of the pin 36.

An alternate method of correcting minor variations in the amount of casing in the various compartments is to disengage a godet and rotate it rapidly by hand to transfer any desired amount of the casing into the next succeeding tank. The operator can then engane the godet with the drive pin by pressure against the shim.

An alternate means of driving the godet is shown in FIG. 6. In this modification, a slot 60 in the bar 10 is dimensioned to receive the pin 36. The advantage of this modification is the elimination of the shoulder 38 which can come into contact with and damage the casing if the casing should become misaligned and slide off of the cylindrical elements 20 and 32.

What is claimed is:

1. Apparatus for transporting and folding a continuous length of extruded collagen casing comprising:
    a bar having a longitudinal slot in one end thereof mounted on a shaft;

a first cylindrical member adapted to slide on said bar with the axis of the cylinder parallel to said shaft whereby the distance between the axis of the cylindrical member and the axis of the shaft may be varied;

a second cylindrical member mounted on the other end of said bar with its axis parallel to the shaft, the radius of that end of each cylinder member most remote from said bar being the same as the diameter of said cylinder member at the end contacting said bar, and the diameter being the greatest at a point midway between said ends;

means for releasably engaging the bar with the shaft; and, means for releasably holding the bar in engagement with the shaft.

2. The apparatus of claim 1 wherein said first cylindrical member has a bolt passing therethrough, said bolt being parallel to the axis of the cylindrical member and fitted at the threaded end thereof with a handle, the other end of said bolt engaging said slot whereby the cylindrical member is secured in a fixed position when said handle is tightened.

3. The apparatus of claim 1 wherein said cylindrical elements have secured thereto strips of a fabric.

4. Apparatus for transporting and folding a continuous length of extruded collagen casing comprising:

a bar having a longitudinal slot in one end thereof mounted on a shaft;

a pin in said shaft dimensioned to engage a shoulder on said bar;

a first cylindrical member adapted to slide on said bar with the axis of the cylinder parallel to said shaft whereby the distance between the axis of the cylindrical member and the axis of the shaft may be varied;

a second cylindrical member mounted in a fixed position on the other end of said bar with its axis parallel to the shaft; and, means for releasably holding the bar in engagement with the pin.

5. Apparatus for transporting and folding a continuous length of extruded collagen casing comprising:

a shaft at one end of which is a pin disposed perpendicular to the axis of the shaft;

a bar mounted on said shaft and having a recess therein dimensioned to receive said pin, said bar being moveable in a direction parallel to the axis of the shaft;

a first cylindrical member adapted to slide on said bar with the axis of the cylinder parallel to the axis of shaft whereby the distance between the axis of the cylindrical member and the axis of the shaft may be varied;

a second cylindrical member mounted on the other end of said bar with its axis parallel to the shaft;

means for releasably engaging the pin with the recess in the shaft; and, means for releasably holding the bar in engagement with the shaft.

References Cited

UNITED STATES PATENTS

| | | | |
|---|---|---|---|
| 102,931 | 5/1870 | Farmer | 242—53 |
| 1,189,184 | 6/1916 | Whiteside | 192—67 |
| 1,648,996 | 11/1927 | Reibel | 192—67 |
| 2,353,615 | 7/1944 | Kauffmann | 68—5.4 |
| 2,954,235 | 9/1958 | Mursch | 226—192 |

EUGENE R. CAPOZIO, *Primary Examiner.*

P. V. WILLIAMS, *Assistant Examiner.*

UNITED STATES PATENT OFFICE
CERTIFICATE OF CORRECTION

Patent No. 3,351,338　　　　　　　　　　　　　November 7, 1967

Michael A. Petrozziello

It is hereby certified that error appears in the above numbered patent requiring correction and that the said Letters Patent should read as corrected below.

Column 2, line 58, for "engane" read -- engage --; column 4, line 31, for "2,954,235" read -- 2,854,235 --.

Signed and sealed this 11th day of June 1968.

(SEAL)
Attest:

Edward M. Fletcher, Jr.
Attesting Officer

EDWARD J. BRENNER
Commissioner of Patents